United States Patent
Wang et al.

(10) Patent No.: US 10,892,795 B2
(45) Date of Patent: Jan. 12, 2021

(54) TRANSMISSION METHOD, NETWORK DEVICE, AND TERMINAL DEVICE

(71) Applicant: HUAWEI TECHNOLOGIES CO., LTD., Guangdong (CN)

(72) Inventors: Chao Wang, Shanghai (CN); Yan Chen, Shanghai (CN); Yiqun Wu, Shanghai (CN); Liqing Zhang, Ottawa (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/522,395

(22) Filed: Jul. 25, 2019

(65) Prior Publication Data

US 2019/0349024 A1 Nov. 14, 2019

Related U.S. Application Data

(63) Continuation of application No. PCT/CN2018/073948, filed on Jan. 24, 2018.

(30) Foreign Application Priority Data

Jan. 26, 2017 (CN) .......................... 2017 1 0057303

(51) Int. Cl.
*H04B 1/7143* (2011.01)
*H04L 5/00* (2006.01)

(52) U.S. Cl.
CPC ......... *H04B 1/7143* (2013.01); *H04L 5/0048* (2013.01)

(58) Field of Classification Search
CPC ....... H04B 1/713; H04B 1/7143; H04B 1/715
See application file for complete search history.

(56) References Cited

U.S. PATENT DOCUMENTS

| 5,287,384 A | * | 2/1994 | Avery | H04B 1/713 |
|---|---|---|---|---|
| | | | | 375/134 |
| 6,859,450 B1 | * | 2/2005 | Mansfield | H04B 7/2621 |
| | | | | 370/324 |

(Continued)

FOREIGN PATENT DOCUMENTS

| CN | 101534525 A | 9/2009 |
|---|---|---|
| CN | 106134123 A | 11/2016 |

(Continued)

OTHER PUBLICATIONS

Huawei et al.,"Support of URLLC in UL",3GPP TSG RAN WG1 NR Ad Hoc Meeting R1-1700024,Spokane, Washington, USA, Jan. 16-20, 2017,total 16 pages.

(Continued)

*Primary Examiner* — Shuwang Liu
*Assistant Examiner* — Gina M McKie
(74) *Attorney, Agent, or Firm* — Womble Bond Dickinson (US) LLP

(57) ABSTRACT

This application provides a transmission method that improves performance of detecting a terminal device by a network device. The method includes may include determining, by a network device, frequency hopping sequences of N terminal devices grouped into a plurality of groups in each of L adjacent slots, where any two terminal devices in each group of terminal devices use a same frequency resource, any two groups of terminal devices in each slot use different frequency resources, and each group of terminal devices in each slot includes a maximum of K terminal devices, pilot signals used by each group of terminal devices are elements in a set that includes K different pilot signals, and pilot signals used by any two terminal devices in each group in each slot are different. The method may also include sending, by the network device, first indication information to a first terminal device in the N terminal (Continued)

devices, where the first indication information determines a frequency hopping sequence of the first terminal device and a pilot signal used by the first terminal device in each slot.

18 Claims, 11 Drawing Sheets

(56) References Cited

U.S. PATENT DOCUMENTS

| | | | | |
|---|---|---|---|---|
| 2002/0191569 | A1* | 12/2002 | Sung | H04J 13/00 370/335 |
| 2007/0010226 | A1* | 1/2007 | Laroia | H04B 1/12 455/296 |
| 2010/0177687 | A1 | 7/2010 | Sung et al. | |
| 2011/0122922 | A1 | 5/2011 | Eriksson Lowenmark et al. | |
| 2012/0163495 | A1 | 6/2012 | Xin et al. | |
| 2019/0013918 | A1 | 1/2019 | Bengtsson | |

FOREIGN PATENT DOCUMENTS

| | | |
|---|---|---|
| JP | 2013516888 A | 5/2013 |
| JP | 2015521004 A | 7/2015 |

OTHER PUBLICATIONS

Huawei et al.,"Reference signal design for UL grant-free transmission",3GPP TSG RAN Wg 1 Meeting#86bis R1-1609446,Lisbon, Portugal, Oct 10-14, 2016,total 4 pages.

Huawei et al.,"Resource allocation and management for grant-free UL",3GPP TSG RAN WG 1 Meeting #86bis R1-1608861,Lisbon, Portugal, Oct. 10-14, 2016,total 6 pages.

* cited by examiner

TRANSMISSION METHOD, NETWORK DEVICE, AND TERMINAL DEVICE

CROSS-REFERENCE TO RELATED APPLICATIONS

This application is a continuation of International Application No. PCT/CN2018/073948, filed on Jan. 24, 2018, which claims priority to Chinese Patent Application No. 201710057303.0, filed on Jan. 26, 2017. The disclosures of the aforementioned applications are hereby incorporated by reference in their entireties.

TECHNICAL FIELD

This application relates to the communications field, and more specifically, to a transmission method, a network device, and a terminal device.

BACKGROUND

In a wireless communications system, when a terminal device moves at a low speed, channels on a same frequency band do not change significantly over time. If the terminal device performs transmission only on one frequency band, an accurate transmission rate cannot be effectively ensured when a channel status is poor. In addition, even at a same time, channels that signals of different frequency bands pass through are significantly different. Therefore, the terminal device can obtain a diversity in frequency domain by sending data in adjacent slots by using different frequency bands, to improve transmission performance. This technology is also referred to as a frequency hopping (FH) technology. A frequency hopping location of the terminal device in each slot is determined by a frequency hopping sequence delivered by a network device. Transmission reliability of each terminal device can be effectively improved by properly allocating the frequency hopping sequence.

In actual application, a plurality of terminal devices may use a same frequency hopping sequence, and the plurality of terminal devices send data to the network device at a same time, and therefore, the network device cannot detect each terminal device and data sent by each terminal device. Therefore, a solution that improves performance of detecting a terminal device by a network device is urgently needed.

SUMMARY

This application provides a transmission method, a network device, and a terminal device, so as to improve performance of detecting the terminal device by the network device.

According to a first aspect, a transmission method is provided, and the method includes: determining, by a network device, a frequency hopping sequence of each of N terminal devices grouped into a plurality of groups in each of L adjacent slots, where a length of the frequency hopping sequence is L, any two terminal devices in each group of terminal devices in each slot use a same frequency resource, any two groups of terminal devices in each slot use different frequency resources, and each group of terminal devices in each slot includes a maximum of K terminal devices, where $N>2$, $L \geq 2$, $2 \leq K < N$, pilot signals used by each group of terminal devices in each slot are elements in a set that includes K different pilot signals, and pilot signals used by the any two terminal devices in each group in each slot are different; and sending, by the network device, first indication information to a first terminal device in the N terminal devices, where the first indication information is used to determine a frequency hopping sequence of the first terminal device and a pilot signal used by the first terminal device in each slot.

It should be understood that the first terminal device is any one of the N terminal devices.

In the transmission method according to this embodiment of this application, when the terminal device uses a frequency hopping scheme, each terminal device in the group is configured with a different pilot signal, and all groups share a pilot pool including K (each group includes a maximum of K terminal devices) pilot signals. Therefore, the transmission method according to this embodiment of this application can reduce a total quantity of pilot signals, and can improve performance of detecting the terminal device (for example, the first terminal device) by the network device.

In a possible embodiment, the frequency hopping sequence indication information includes a frequency hopping sequence number of the first terminal device or an identifier of the first terminal device, and the identifier (ID) of the first terminal device corresponds to the frequency hopping sequence of the first terminal device.

Optionally, the frequency hopping sequence number is in a one-to-one correspondence with the frequency hopping sequence. The frequency hopping sequence of the first terminal device may be determined based on the frequency hopping sequence number of the first terminal device.

Optionally, the frequency hopping sequence number corresponds to a plurality of frequency hopping sequences, and lengths of any two of the plurality of frequency hopping sequences are different.

Optionally, the identifier of the terminal device is in a one-to-one correspondence with the frequency hopping sequence. The frequency hopping sequence of the first terminal device may be determined based on the identifier of the first terminal device.

Optionally, the identifier of the terminal device corresponds to a plurality of frequency hopping sequences, and lengths of any two of the plurality of frequency hopping sequences are different.

In a possible embodiment, the first indication information further includes length indication information and/or available frequency band indication information, the length indication information is used to indicate a length of the frequency hopping sequence of the first terminal device, and the available frequency band indication information is used to indicate a frequency resource that can be used in the L adjacent slots.

When the frequency hopping sequence number corresponds to the plurality of frequency hopping sequences or the identifier of the terminal device corresponds to the plurality of frequency hopping sequences, the frequency hopping sequence of the terminal device may be determined based on the frequency hopping sequence number or the identifier and the length of the terminal device.

Optionally, the frequency resource includes a plurality of consecutive frequency bands.

Optionally, the available frequency band indication information may include start locations of the plurality of consecutive frequency bands and bandwidth occupied by each frequency band.

In a possible embodiment, the sending, by the network device, first indication information to a first terminal device in the N terminal devices includes:

simultaneously sending, by the network device in a multicast manner, the first indication information to a plurality of terminal devices that use a same frequency hopping sequence, where the plurality of terminal devices include the first terminal device.

In a possible embodiment, at least some of the terminal devices in each group use a same frequency hopping sequence.

In a possible embodiment, terminal devices grouped into a same group in a first slot in the L slots are grouped into a same group in any other slot.

In a possible embodiment, at least some of terminal devices grouped into a same group in a first slot in the L slots are not in a same group in another slot.

In a possible embodiment, the first indication information further includes pilot signal indication information, and the pilot signal indication information is used to indicate the pilot signal used by the first terminal device in each slot.

In a possible embodiment, the sending, by the network device, first indication information to a first terminal device in the N terminal devices includes:

simultaneously sending, by the network device in the multicast manner, the first indication information to a plurality of terminal devices that use a same pilot signal in the L adjacent slots, where the plurality of terminal devices include the first terminal device.

In a possible embodiment, the first terminal device uses a same pilot signal in the L adjacent slots.

In a possible embodiment, frequency hopping sequences of any two of the N terminal devices are different.

Therefore, by grouping two terminal devices into different groups in consecutive slots, a probability that the two terminal devices collide with each other during both initial transmission and retransmission can be reduced.

In a possible embodiment, the first terminal device uses a same pilot signal in any two of the L adjacent slots.

That is, only one pilot signal needs to be allocated to each terminal device. In this way, the total quantity of pilot signals can be reduced; and in addition, complexity of configuring the pilot signal for the terminal device by a network can be reduced, and performance of detecting the terminal device by the network device can be improved.

In a possible embodiment, pilot signals used by at least some of the N terminal devices in at least two of the L adjacent slots are different.

In this way, by grouping the terminal devices into different groups in the adjacent slots, and by enabling the terminal device to use different pilot signals in the adjacent slots, the terminal devices are regrouped and the pilot signals are re-allocated, so that probability that the two terminal devices collide with each other during both initial transmission and retransmission is further reduced.

In a possible embodiment, before determining, by a network device, a frequency hopping sequence of each of N terminal devices grouped into a plurality of groups in each of L adjacent slots, the method may further include:

grouping, by the network device, the N terminal devices into the plurality of groups in each of the L adjacent slots.

In a possible embodiment, the grouping, by the network device, the N terminal devices into the plurality of groups in each of the L adjacent slots includes:

grouping, by the network device, the N terminal devices into the plurality of groups in each of the L adjacent slots based on at least one of the following conditions: a channel condition, a distance between the network device and each of the N terminal devices, or a packet arrival rate of each of the N terminal devices.

Optionally, the network device groups terminal devices that are far away from each other into one group based on distances between the terminal devices and the network device. In this way, correlation between channels of terminal devices in the group can be reduced.

Optionally, the network device may group terminal devices having relatively good channel conditions and terminal devices having relatively poor channel conditions into one group based on the channel condition. In this way, a signal-to-noise ratio gap (SNR Gap) may be formed to enhance performance of serial interference detection (Successive Interference Cancellation, SIC).

Optionally, the network device may group terminal devices having high packet arrival rates and terminal devices having low packet arrival rates into one group based on the packet arrival rate. In this way, service traffic can be balanced between groups.

It should be understood that "good", "poor", "far", "close", "high", and "low" described above are obtained by comparing the N terminal devices with each other.

According to a second aspect, a transmission method is provided, including: receiving, by a first terminal device, first indication information sent by a network device, where the first terminal device is one of N terminal devices grouped by the network device into a plurality of groups in each of L adjacent slots, where N>2, and L≥2; and determining, by the first terminal device based on the first indication information, a frequency hopping sequence of the first terminal device and a pilot signal used by the first terminal device in each slot.

In a possible embodiment, the first indication information includes frequency hopping sequence indication information, and the frequency hopping sequence indication information is used to indicate the frequency hopping sequence used by the first terminal device.

In a possible embodiment, the frequency hopping sequence indication information includes a frequency hopping sequence number of the first terminal device or an identifier of the first terminal device, and the identifier of the first terminal device corresponds to the frequency hopping sequence of the first terminal device.

In a possible embodiment, the determining, by the first terminal device based on the first indication information, a frequency hopping sequence of the first terminal device and a pilot signal used by the first terminal device in each slot includes:

determining, by the first terminal device, the frequency hopping sequence of the first terminal device based on the frequency hopping sequence indication information; and determining, by the first terminal device based on a mapping relationship between the frequency hopping sequence and the pilot signal, the pilot signal used by the first terminal device in each slot.

In a possible embodiment, the first indication information includes pilot signal indication information, and the pilot signal indication information is used to indicate the pilot signal used by the first terminal device in each slot.

In a possible embodiment, the first indication information further includes available frequency band indication information and/or length indication information, the available frequency band indication information is used to indicate a frequency resource that can be used in the L adjacent slots, and the length indication information is used to indicate a length of the frequency hopping sequence of the first terminal device.

In a possible embodiment, the first terminal device uses a same pilot signal in any two of the L adjacent slots.

According to a third aspect, a network device is provided, and is configured to perform the method in the first aspect or any possible implementation of the first aspect. Specifically, the network device includes a unit configured to perform the method in the first aspect or any possible implementation of the first aspect.

According to a fourth aspect, user equipment is provided, and is configured to perform the method in the second aspect or any possible implementation of the second aspect. Specifically, the network device includes a unit configured to perform the method according to the second aspect or any possible implementation of the second aspect.

According to a fifth aspect, a network device is provided, and the network device includes a memory and a processor. The memory is configured to store a computer program, and the processor is configured to invoke the computer program from the memory and run the computer program, so as to enable the network device to perform the method in the first aspect and any possible implementation of the first aspect.

According to a sixth aspect, user equipment is provided, and the user equipment includes a memory and a processor. The memory is configured to store a computer program, and the processor is configured to invoke the computer program from the memory and run the computer program, so as to enable the user equipment to perform the method in the second aspect and any possible implementation of the second aspect.

According to a seventh aspect, a computer readable storage medium is provided and is configured to store a computer program, and the computer program includes an instruction that is used to perform the methods in the first aspect and the second aspect or any possible implementation of the first aspect and the second aspect.

According to an eighth aspect, a computer program product including an instruction is provided. When the computer program product runs on a computer, the computer is enabled to perform the methods in the first aspect and the second aspect or any possible implementation of the first aspect and the second aspect.

DESCRIPTION OF DRAWINGS

FIG. 8 is a schematic diagram of allocating pilot signals and frequency hopping sequences according to an embodiment of this application;

FIG. 9 is a schematic diagram of allocating pilot signals and frequency hopping sequences according to an embodiment of this application;

FIG. 10 is a schematic diagram of allocating pilot signals and frequency hopping sequences according to an embodiment of this application;

DESCRIPTION OF EMBODIMENTS

Figure 1:
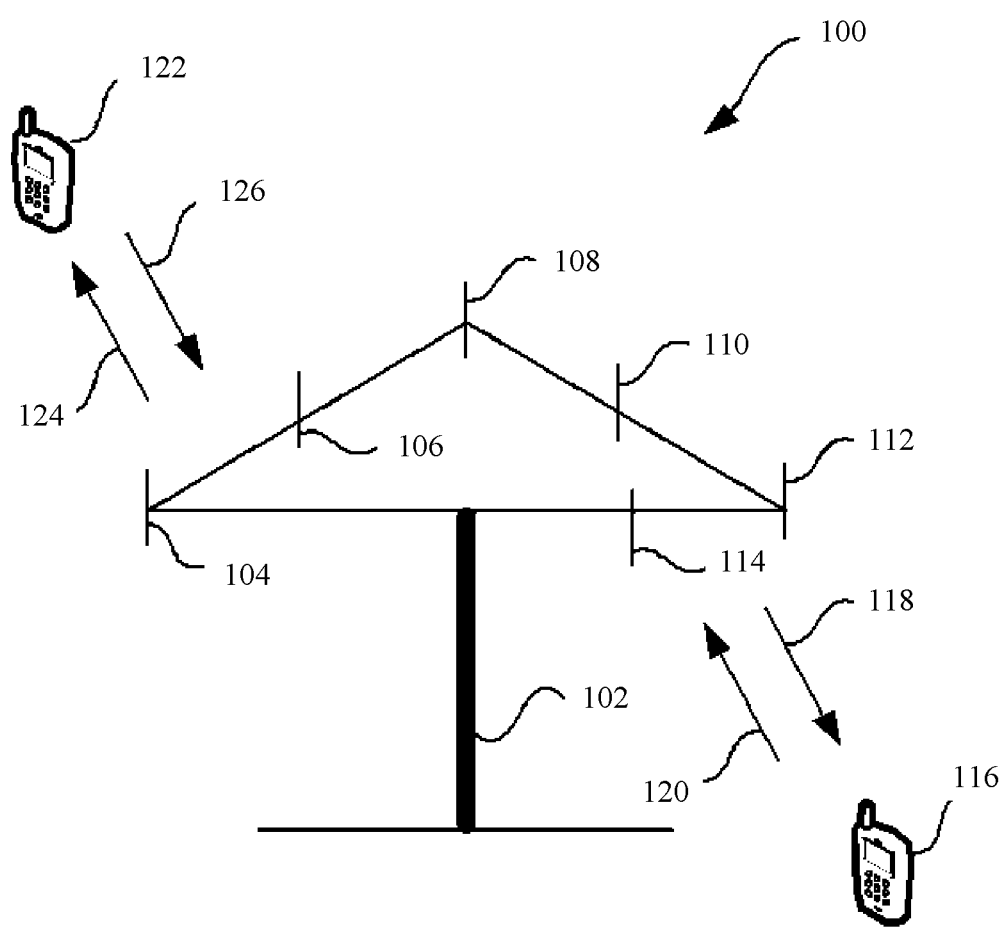
FIG. 1 is a schematic diagram of a communications system of a transmission method according to an embodiment of this application.

The following describes technical solutions of this application with reference to the accompanying drawings.

Terms such as "component", "module", "system" and "unit" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed on two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the embodiments of this application may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, a Universal Mobile Telecommunications System (UMTS), or a next-generation communications system.

The embodiments of this application describe the embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a station (STA) in a wireless local area network (WLAN), or may be a cellular phone, a cordless telephone set, a Session Initiation Protocol (SIP) phone, a wireless local loop (WLL) station, a personal digital assistant (PDA) device, a handheld device having a wireless communication function, a computing device or another processing device connected to a wireless modem, an in-vehicle device, a wearable device, a terminal device in a next-generation communications system such as a 5th generation (5G) communications network, or a terminal device in a future evolved public land mobile network (PLMN).

By way of example and not limitation, in the embodiments of this application, the terminal device may alternatively be a wearable device. The wearable device may also be referred to as a wearable smart device, and is a general term for devices such as glasses, gloves, watches, clothing, or shoes that can be worn and that are developed by intelligently designing everyday wearing by applying a wearable technology. The wearable device is a portable device that is directly worn on the body or that is integrated into clothing or accessories of users. The wearable device is more than a hardware device, and implements powerful functions through software support, data exchange, and cloud interaction. General wearable smart devices include a full-functioned and large-size device that can implement all or some functions without a smartphone, such as a smartwatch or smart glasses; and a device that focuses on only one specific type of application functions and needs to be used together with another device such as a smartphone, such as various smart bands or smart jewelry for vital sign monitoring.

In addition, the embodiments of this application describe the embodiments with reference to a network device. The network device may be a device configured to communicate with a mobile device. The network device may be an access point (AP) in a WLAN or a base transceiver station (BTS) in GSM or CDMA, or may be a NodeB (NB) in WCDMA; or may be an evolved NodeB (eNB or eNodeB) in LTE, or a regeneration station or an access point, or an in-vehicle device, a wearable device, a network device in a future 5G network, a network device in a future evolved PLMN network, or the like.

In addition, in the embodiments of this application, the network device provides a service for a cell. The terminal device communicates with the network device by using a transmission resource (for example, a frequency domain resource or a spectrum resource) used in the cell. The cell may be a cell corresponding to the network device (for example, a base station). The cell may belong to a macro base station, or a base station corresponding to a small cell. The small cell herein may include a metro cell, a micro cell, a pico cell, a femto cell, or the like. The small cells have features such as small coverage and low transmit power, and are used to provide high-rate data transmission services.

FIG. 1 is a schematic diagram of a wireless communications system according to an embodiment of this application. As shown in FIG. 1, the communications system 100 includes a network device 102. The network device 102 may include one or more antennas, for example, antennas 104, 106, 108, 110, 112, and 114. In addition, the network device 102 may additionally include a transmitter chain and a receiver chain. A person of ordinary skilled in the art may understand that, both the transmitter chain and the receiver chain may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or the terminal device 122. Each of the terminal devices 116 and 122 may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or antenna group including a plurality of antennas) and/or area designed for communication is referred to as a sector of the network device 102. For example, the antenna group may be designed to communicate with a terminal device in a sector within a coverage area of the network device 102. The network device may send signals to all terminal devices in a corresponding sector by using a single antenna or a multi-antenna transmit diversity. When the network device 102 respectively communicates with the terminal devices 116 and 122 by using the forward links 118 and 124, transmit antennas of the network device 102 may increase signal-to-noise ratios of the forward links 118 and 124 through beamforming. In addition, compared with a manner in which the network device sends the signals to all the terminal devices by using the single antenna or the multi-antenna transmit diversity, this manner may reduce interference to a mobile device in a neighboring cell when the network device 102 sends, through beamforming, signals to the terminal devices 116 and 122 randomly distributed in a related coverage area.

Within a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits that need to be sent to the wireless communications receiving apparatus by using a channel. The data bit may be included in a transport block (or a plurality of transport blocks) of data, and the transport block may be segmented to generate a plurality of code blocks.

In addition, the communications system 100 may be a PLMN network, a D2D network, an M2M network, or another network. FIG. 1 is only an example of a simplified schematic diagram. The network may further include another network device that is not shown in FIG. 1.

In this embodiment of this application, the communications system 100 may be a grant-free communications system. The grant-free transmission means that user data uplink transmission can be implemented without dynamic scheduling of a network device. To this end, before performing the grant-free transmission, the base station usually needs to specify an available grant-free resource for the terminal in advance, for example, an uplink pilot resource and a time-frequency resource, and the base station may need to use a method such as blind detection, to receive data sent by the terminal. Blind detection may be understood as detection that is performed, when it is unknown in advance whether data arrives, on data that may arrive.

In an existing grant-free uplink transmission system, reliability of UE transmission can be improved by grouping terminal devices and properly allocating frequency hopping sequences. In addition to improving reliability of UE transmission, performance of detecting the terminal device by the network device needs to be ensured. In the prior system, a solution in which a network device determines, by detecting a pilot signal, a terminal device that performs uplink transmission is provided.

However, in the prior system, a solution of allocating pilot signals to terminal devices after the terminal devices are grouped is not provided. Therefore, there is an urgent need for a design solution of allocating pilot signals after terminal devices are grouped, so as to improve performance of detecting the terminal device by the network device.

Therefore, this application provides a transmission method. In the method, a terminal device uses a grouping frequency hopping scheme, each terminal device in a group is configured with a different pilot signal, and all groups share a pilot pool including K (each group includes a maximum of K terminal devices) pilot signals. Therefore, the transmission method according to this embodiment of this application can reduce a total quantity of pilot signals, and can improve performance of detecting a terminal device by a network device.

Optionally, in the transmission method in this embodiment of this application, the network device may first group N terminal devices into a plurality of groups (denoted as G groups below for ease of description) in each of L adjacent slots $N>2$, $L\geq2$, and $G\geq2$.

Each group may include a maximum of K terminal devices. Any two terminal devices in each group of terminal devices in each slot use a same frequency resource, and any two groups of terminal devices in each slot use different frequency resources. That any two groups of terminal devices in each slot use different frequency resources may mean that any two groups of terminal devices in each slot use different frequency bands. Then, the G groups are corresponding to G different frequency bands. The G frequency bands are some or all of resources in a system channel resource pool. The system channel resource pool includes F frequency bands, and $F\geq G$ Each group uses a frequency band corresponding to the group for uplink transmission.

The channel resource pool may be understood as frequency bands that can be used by the N terminal devices in the L adjacent slots.

In this embodiment of this application, for example, the network device may group the N terminal devices in a fixed grouping manner.

The fixed grouping manner may be understood as that a plurality of terminal devices grouped into one group in one of the L slots are also grouped into one group in another slot.

For another example, the network device may group the N terminal devices in a regrouping manner.

The regrouping manner may be understood as that at least some of terminal devices grouped into a same group in a first slot in the L slots are not in a same group in another slot. Alternatively, the regrouping manner may be understood as that terminal devices grouped into one group in one of the L slots are grouped into a plurality of groups in another slot. This means that all the terminal devices grouped into one group in one of the L slots are not in a same group in another slot; or some of the terminal devices grouped into one group in one of the L slots are grouped into one group in another slot, but other terminal devices are grouped into other groups.

By way of example and not limitation, for any one of the L slots, when N is exactly divisible by G, the network device may equally or unequally group the N terminal devices.

For example, N=16, and G=4, when the N terminal devices are equally grouped, for any slot, each group (or referred to as each group of terminal devices) may include four terminal devices, and in this case, K=4. When the N terminal devices are unequally grouped, a first group and a second group may each include four terminal devices, a third group may include three terminal devices, and a fourth group may include five terminal devices, and in this case, K=5.

By way of example and not limitation, for any one of the L slots, when N is not exactly divisible by G, the network device may group the N terminal devices in a manner in which each of G-1 groups includes K=⌈N/G⌉ terminal devices. ⌈N/G⌉ represents rounding up N/G.

For example, N=15, and G=4, when N=4, in a first group to a fourth group, three groups may each include four terminal devices, and the remaining group includes three terminal devices.

It should be understood that, in this embodiment of this application, a specific manner of unequal grouping is not limited, and may be determined based on an actual situation during specific implementation.

Optionally, in this embodiment of this application, the network device may group the N terminal devices based on at least one of the following conditions:

a channel condition, a distance between the network device and each of the N terminal devices, or a packet arrival rate of each of the N terminal devices.

By way of example and not limitation, the network device may group terminal devices that are far away from each other into one group based on distances between the terminal devices and the network device. In this way, correlation between channels of terminal devices in the group can be reduced.

Figure 2:
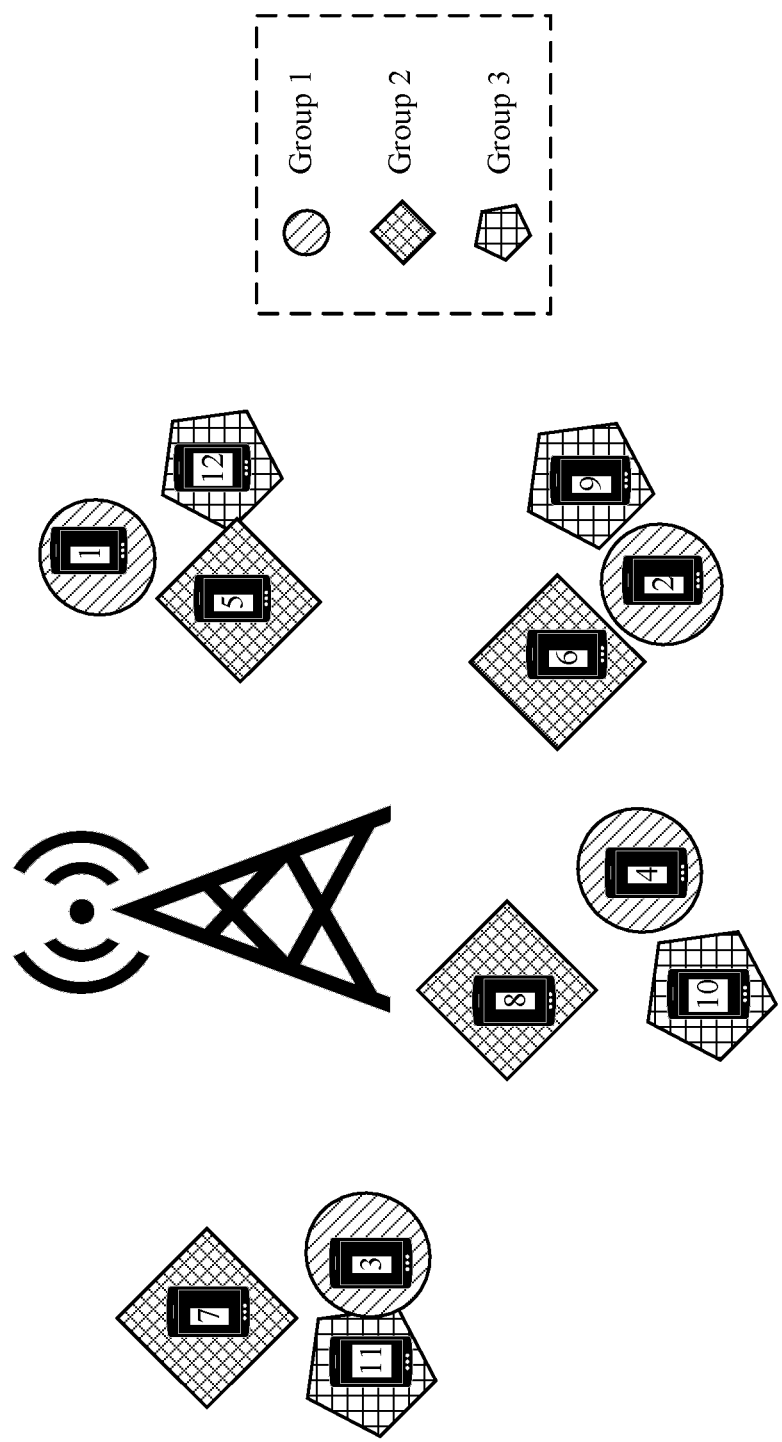
FIG. 2 is a schematic diagram of grouping terminal devices according to an embodiment of this application.

For example, with reference to FIG. 2, terminal devices 1 to 4 are far away from each other, and the network device may group the four terminal devices into one group; terminal devices 5 to 8 are far away from each other, and the network device may group the terminal devices 5 to 8 into one group; and terminal devices 9 to 12 are far away from each other, and the network device may group these four terminal devices into one group.

By way of example and not limitation, the network device may group terminal devices having relatively good channel conditions and terminal devices having relatively poor channel conditions into one group based on the channel condition. In this way, a signal-to-noise ratio gap (SNR Gap) may be formed to enhance performance of serial interference detection (Successive Interference Cancellation, SIC).

Figure 3:
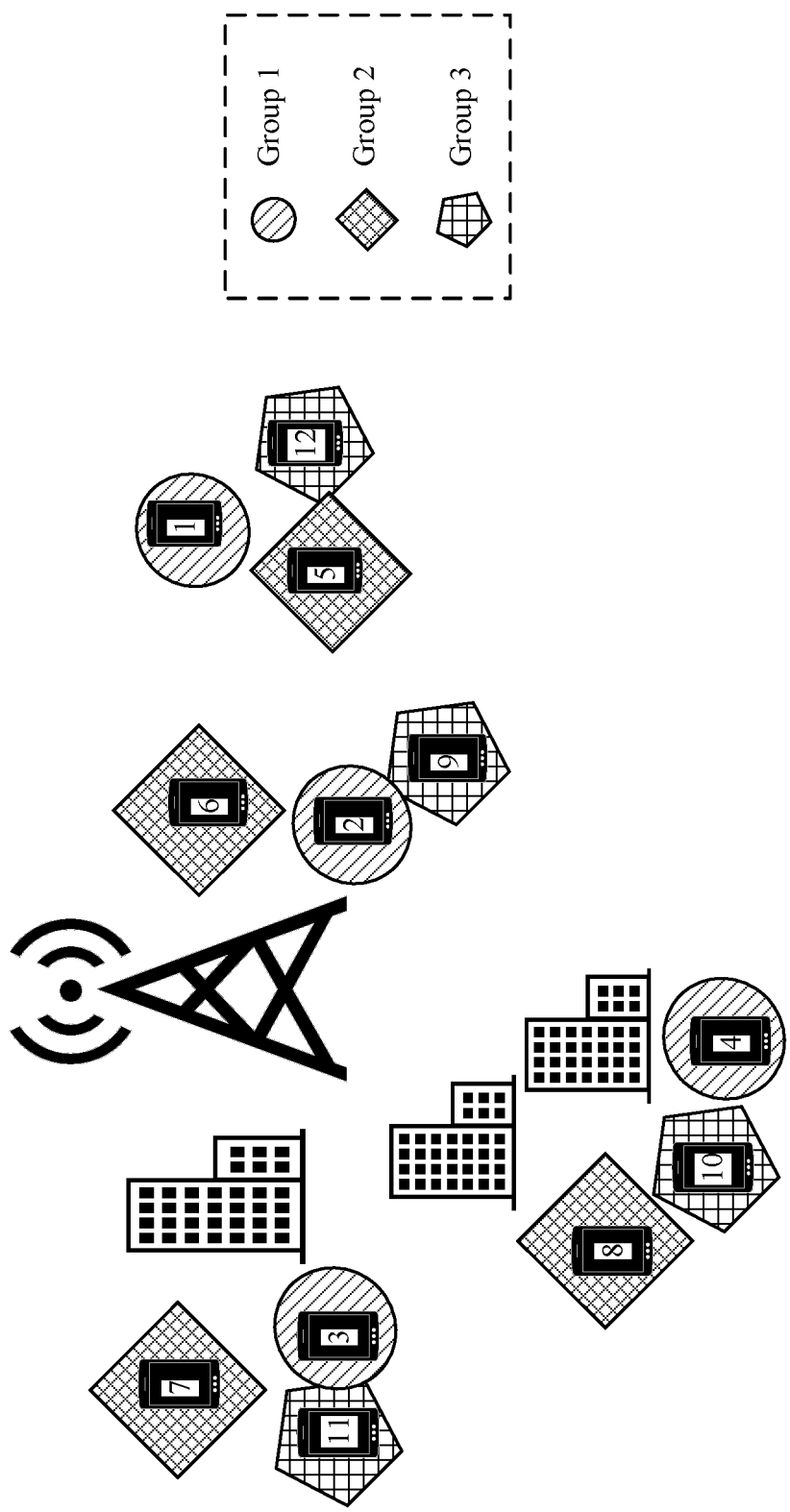
FIG. 3 is a schematic diagram of grouping terminal devices according to another embodiment of this application.

For example, with reference to FIG. 3, terminal devices 2, 6, and 9 are closest to the network device and are not obstructed, and therefore the terminal devices 2, 6, and 9 have best channel conditions; terminal devices 1, 5, and 12 are far away from the network device but are not obstructed, and therefore the terminal devices 1, 5, and 12 have suboptimal channel conditions; terminal devices 3, 7, and 11 are far away from the network device and are obstructed, and therefore the terminal devices 3, 7, and 11 have relatively poor channel conditions; and terminal devices 4, 8, and 10 are far away from the network device and are seriously obstructed, and therefore the terminal devices 4, 8, and 10 have worst channel conditions. To enhance the SIC performance, the network device groups terminal devices having different channel conditions into one group, that is, groups the terminal devices 1 to 4 into one group, groups the terminal devices 5 to 8 into one group, and groups the terminal devices 9 to 12 into one group.

By way of example and not limitation, the network device may group terminal devices having high packet arrival rates and terminal devices having low packet arrival rates into one group based on the packet arrival rate. In this way, service traffic can be balanced between groups.

It should be understood that the packet arrival rate refers to a ratio of a quantity of packets that are sent by the terminal device within a specific time period and that are actually received by the network device to a quantity of packets sent by the terminal device within the time period. For example, within 10s, a quantity of packets sent by the terminal device is 100, and a quantity of packets actually received by the network device is 90, and therefore, the packet arrival rate is 0.9.

Figure 4:
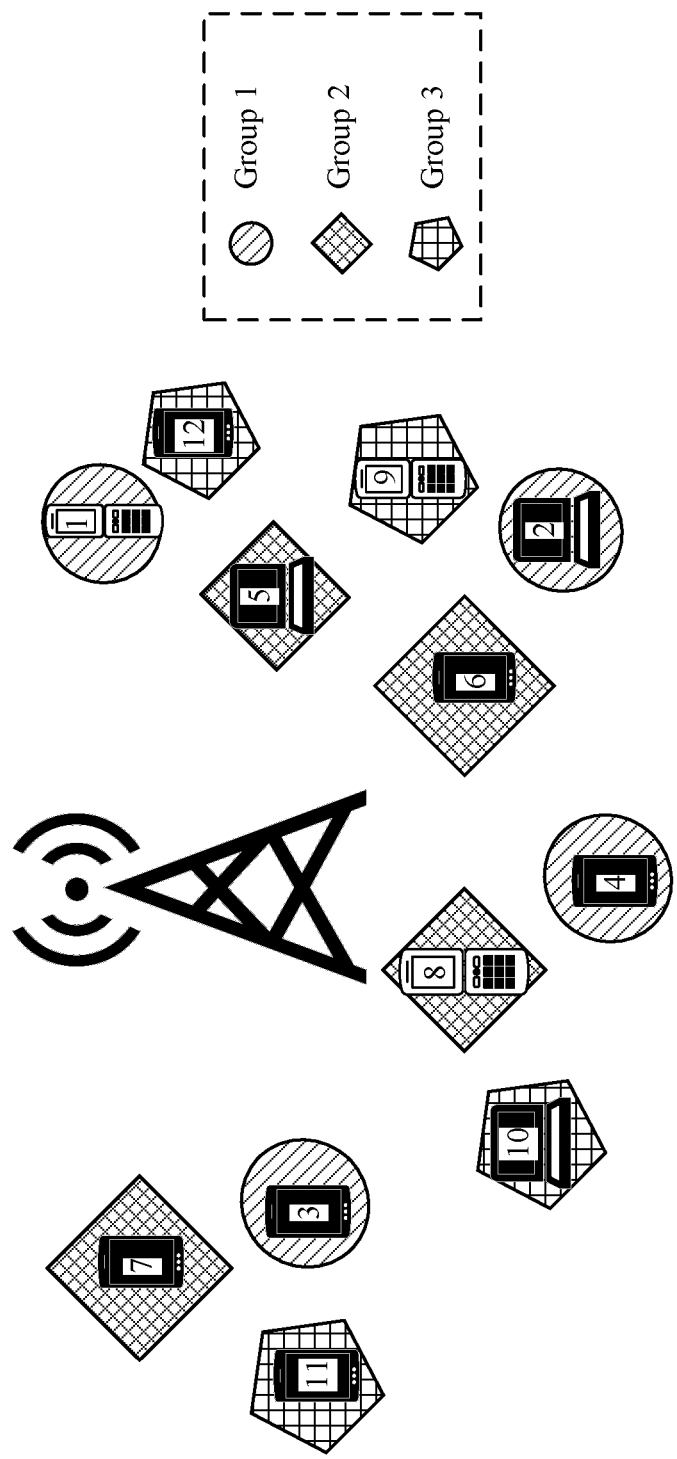
FIG. 4 is a schematic diagram of grouping terminal devices according to still another embodiment of this application.

For example, with reference to FIG. 4, terminal devices 1, 8, and 9 have relatively low packet arrival rates, terminal devices 2, 5, and 10 have relatively high packet arrival rates, and terminal devices 3, 4, 6, 7, 11, and 12 have moderate packet arrival rates. Therefore, the network device may group the terminal devices 1 to 4 into one group, group the terminal devices 5 to 8 into one group, and group the terminal devices 9 to 12 into one group based on the packet arrival rate.

It should be understood that "good", "poor", "far", "close", "high", and "low" described above are obtained by comparing the N terminal devices with each other.

Figure 5:
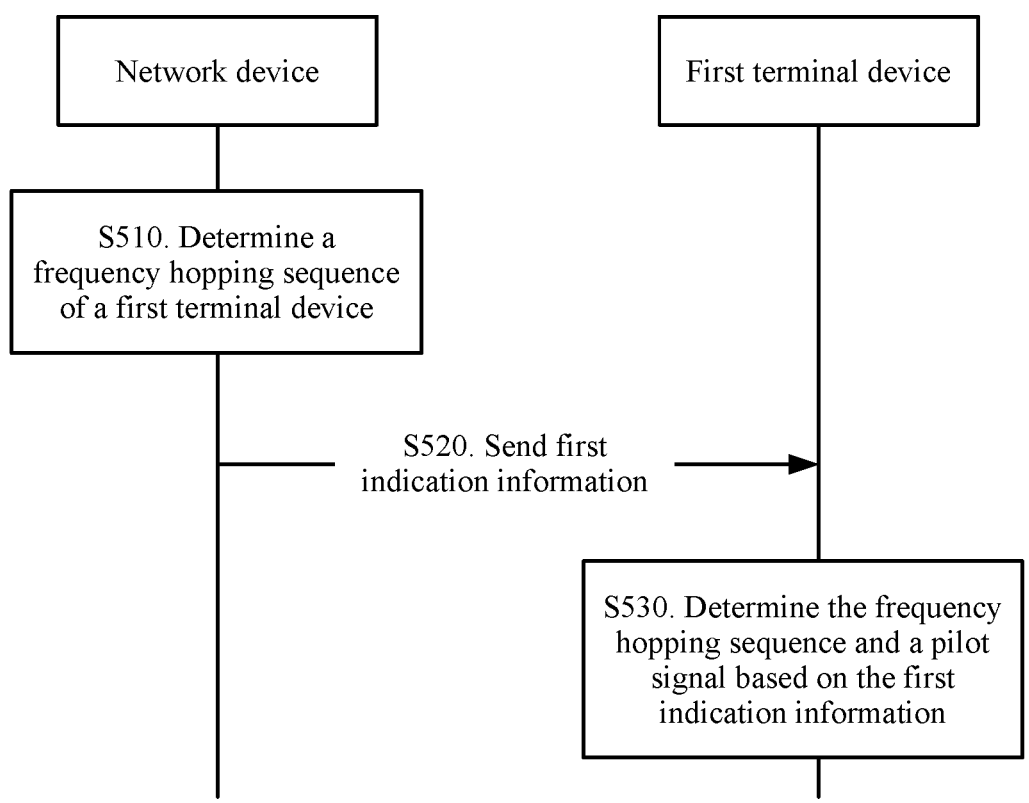
FIG. 5 is a schematic flowchart of a transmission method according to an embodiment of this application.

It should also be understood that the embodiments shown in FIG. 3 to FIG. 5 may be applied to a case of fixed grouping.

The following describes in detail the transmission method in the embodiments of this application.

FIG. 5 is a schematic flowchart of a transmission method according to an embodiment of this application. FIG. 5 is a schematic diagram of a method of transmission between a network device and a first terminal device in the N terminal devices. It should be understood that the first terminal device is any one of the N terminal devices.

S510. A network device determines a frequency hopping sequence of the first terminal device.

Specifically, a length of the frequency hopping sequence of the first terminal device is L. The frequency hopping sequence is used by the first terminal device to determine a frequency resource used for uplink transmission. More specifically, the frequency hopping sequence is used by the first terminal device to determine a frequency band used for uplink transmission. For example, when L=3 and the frequency hopping sequence of the first terminal device is 123, a system may preset correspondences between numbers in the frequency hopping sequence and the F frequency bands. For example, when a sequence of numbers in the frequency hopping sequence indicates the F frequency bands, that the frequency hopping sequence is 123 indicates that, when performing uplink transmission, the first terminal device uses a first frequency band in the F frequency bands in a first slot in the L slots, uses a second frequency band in the F frequency bands in a second slot in the L slots, and uses a third frequency band in the F frequency bands in a third slot in the L slots. For another example, when a reversed sequence of numbers in the frequency hopping sequence indicates the F frequency bands, that the frequency hopping sequence is 123 indicates that, when performing uplink transmission, the first terminal device uses the third frequency band in the F frequency bands in the first slot in the L slots, uses the second frequency band in the F frequency bands in the second slot in the L slots, and uses the first frequency band in the F frequency bands in the third slot in the L slots.

In this embodiment of this application, the N terminal devices are grouped into G groups in each slot, pilot signals used by each of the G groups in each slot are elements in a set that includes K different pilot signals, and pilot signals used by any two terminal devices in each group are different.

The set that includes the K different pilot signals may be understood as a pilot pool, or may be referred to as a pilot pool that includes the K different pilot signals.

That is, in the G groups, each terminal device in a group uses one of the K pilot signals, pilot signals used by all terminal devices in the group are different, and the G groups share the K pilot signals.

It should be understood that, in this embodiment of this application, if not specially noted, the described "each group" refers to each group in any one of the L adjacent slots, or each group in each of the L adjacent slots.

For example, if each group includes K terminal devices, a first terminal device in each group may use a first pilot signal in the K pilot signals, a second terminal device in the group may use a second pilot signal in the K pilot signals, and a $K^{th}$ terminal device in the group may use a $K^{th}$ pilot signal in the K pilot signals. Alternatively, the first terminal device in each group may use the $K^{th}$ pilot signal in the K pilot signals, the second terminal device in the group may use a $(K-1)^{th}$ pilot signal in the K pilot signals, and the $K^{th}$ terminal device in the group may use the first pilot signal in the K pilot signals. This is not limited in this embodiment of this application, provided that the terminal devices in the group do not reuse any one of the K pilot signals.

For the first terminal device, a pilot signal used by the first terminal device is different from a pilot signal used by another terminal device in a group of the first terminal device, and the first terminal device uses one of the K pilot signals in each of the L adjacent slots. The first terminal device may use a same pilot signal in all slots, or may use different pilot signals in different slots.

Optionally, frequency hopping sequences of the any two terminal devices in each group may be the same.

For example, when the network device groups the N terminal devices in the fixed grouping manner, frequency hopping sequences of the any two terminal devices in each group are the same. In other words, the first terminal device and the another terminal device in the group of the first terminal device use a same frequency hopping sequence. In this way, all terminal devices in each group may use a same frequency resource in any one of the L slots. For example, all the terminal devices in each group may perform uplink transmission on a same frequency band.

By way of example and not limitation, in this case, the first terminal device, that is, any one of the N terminal devices may use a same pilot signal in any two of the L adjacent slots.

For example, when all the terminal devices in each group use a same frequency hopping sequence, the first terminal device uses a pilot signal S(i) in all the L adjacent slots, which are represented as a slot i, a slot i+1, . . . , and a slot i+L+1.

Figure 6:
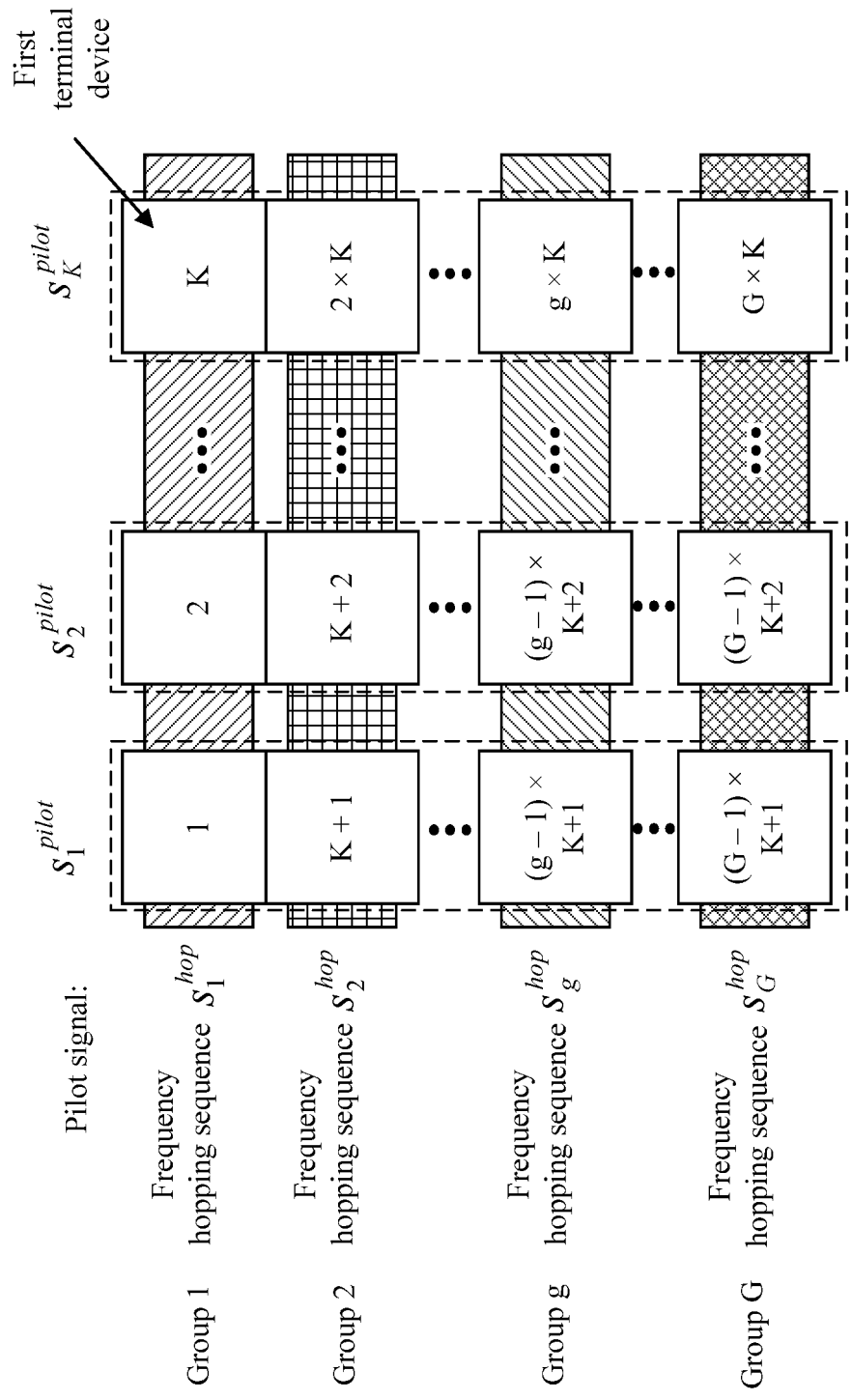
FIG. 6 is a schematic diagram of allocating pilot signals and frequency hopping sequences according to an embodiment of this application.
Figure 7:
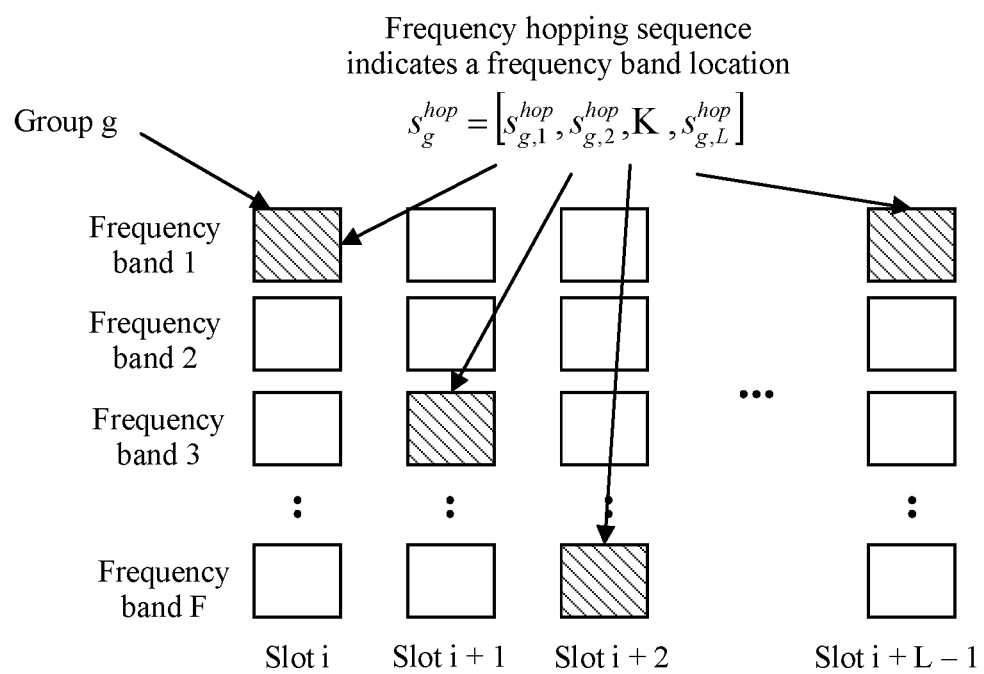
FIG. 7 is a schematic diagram of allocating frequency hopping sequences according to an embodiment of this application.

The following describes, with reference to FIG. 6 and FIG. 7, an embodiment in which the frequency hopping sequences of the any two terminal devices in each group are the same, and the first terminal device uses the same pilot signal in any two of the L adjacent slots.

As shown in FIG. 6, channels are divided into a total of F frequency bands, and the N terminal devices may use the F frequency bands. The network device groups the N terminal devices whose numbers are (1, 2, . . . , and N) into G (G≤F) groups, and each group includes K=N/G terminal devices. A $g^{th}$ (1≤g≤G) group includes terminal devices whose numbers are (g−1)*K+1,(g−1)*K+2,K g*K A frequency hopping sequence whose length is L and that is of any terminal device in the $g^{th}$ group is represented as $s_g^{hop}=[s_{g,1}^{hip}, s_{g,2}^{hop}, K, s_{g,L}^{hop}]$, where $1≤s_{g,l}^{hop}≤F, 1≤l≤L$. $s_{g,l}^{hop}$ is used to indicate one of the F frequency bands. For pilot signals, because terminal devices in different groups do not collide with each other, the G groups may share the pilot signals, and therefore, the pilot pool may be represented as $s_k^{pilot}(1≤k≤K)$. All terminal devices that meet mod(n−1, K)+1=k and whose numbers are n (1≤n≤N) may use the pilot signal $s_k^{pilot}$. Z=mod(X, Y) indicates that Z is a remainder obtained after X is divided by Y.

It should be understood that FIG. 3 shows a frequency hopping sequence and a pilot signal used by the first terminal device in only one slot. For another slot in the L slots, a frequency hopping sequence and a pilot signal used by the first terminal device are shown in FIG. 6.

In this embodiment of this application, for the $g^{th}$ group of terminal devices, any terminal device in the group may perform uplink transmission on a frequency band $s_{g,index\_g}^{hop}$. index_g=mod(index_slot, L)+1, and index_slot represents a sequence number of a current slot.

It should be understood that a manner in which a sequence number of a current slot is defined is not limited in this embodiment of this application. For example, a sequence number of a current slot may be a total quantity of slots that include a slot in which the terminal device accesses the network device to a current slot. For example, the terminal device accesses the network device in a slot whose slot index is 0, and an index of a current slot is 2, and therefore, a total quantity of slots is 3, and a sequence number of the current slot is 3.

FIG. 7 shows a specific implementation of performing uplink transmission by the terminal device.

As shown in FIG. 7, frequency bands indicated by $[s_{g,1}^{hop}, s_{g,2}^{hop}, K, s_{g,L}^{hop}]$ in the L slots are [a frequency band 1, a frequency band 3, . . . , and a frequency band F]. It is assumed that L=4. In the slot i, each terminal device in the $g^{th}$ group performs uplink transmission on the frequency band 1; in the slot i+1, each terminal device in the $g^{th}$ group performs uplink transmission on the frequency band 2; in a slot i+2, each terminal device in the $g^{th}$ group performs uplink transmission on the frequency band F; in a slot i+3, each terminal device in the $g^{th}$ group performs uplink transmission on the frequency band 1.

For ease of description, it is assumed in the following that a quantity N of terminal devices is 12, a quantity F of frequency bands is 3, and a length L of the frequency hopping sequence is 4. In each slot, the network device groups the 12 terminal devices into G=3 groups, and each group includes K=4 terminal devices. It should be understood that the quantity of terminal devices, the quantity of frequency bands, and the length of the frequency hopping sequence in an actual system may be any combination, and in this embodiment of this application, the foregoing numbers are used only as an example for description.

Figure 8:
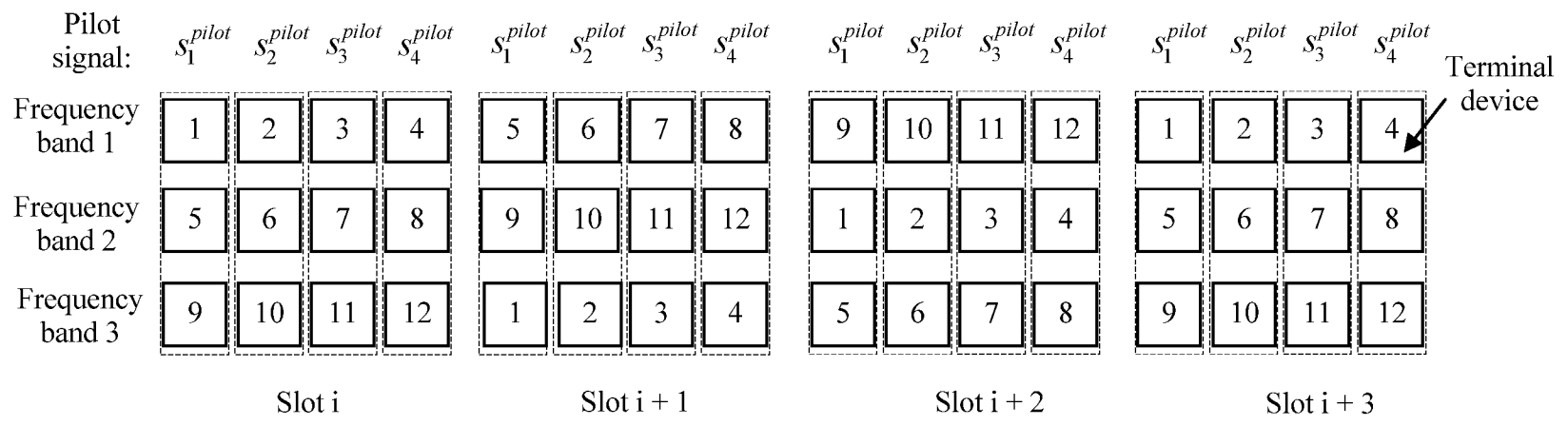

FIG. 8 is a schematic diagram of a frequency hopping sequence and a pilot signal used by the terminal device when the terminal devices are grouped in the fixed grouping manner according to another embodiment of this application.

As shown in FIG. 8, terminal devices numbered 1 to 4 are grouped into one group, and the group is denoted as a group 1; terminal devices numbered 5 to 8 are grouped into one group, and the group is denoted as a group 2; and terminal devices numbered 9 to 12 are grouped into one group, and the group is denoted as a group 3. The terminal devices in each group use the pilot signals $s_1^{pilot}, s_2^{pilot}, s_3^{pilot}, s_4^{pilot}$ respectively in the slot i to the slot i+3. A frequency hopping sequence of each terminal device in the group 1 may be represented as 1321, which indicates that each terminal device in the group 1 uses the frequency band 1, a frequency band 3, the frequency band 2, and the frequency band 1 for uplink transmission respectively in the slot i to the slot i+3. A frequency hopping sequence of each terminal device in the group 2 may be represented as 2132, which indicates that each terminal device in the group 2 uses the frequency band 2, the frequency band 1, the frequency band 3, and the frequency band 2 for uplink transmission respectively in the slot i to the slot i+3. Likewise, a frequency hopping sequence of each terminal device in the group 3 may be represented as 3213, which indicates that each terminal device in the group 1 uses the frequency band 3, the frequency band 2, the frequency band 1, and the frequency band 3 for uplink transmission respectively in the slot i to the slot i+3.

It can be learned that the any two terminal devices in each group use different pilot signals, and the four groups share a pilot pool $\{s_1^{pilot}, s_2^{pilot}, s_3^{pilot}, s_4^{pilot}\}$. Therefore, a total quantity of pilot signals can be reduced, and then performance of detecting the terminal device by the network device can be improved.

Optionally, frequency hopping sequences of some terminal devices in each group may be the same. For example, when the network device regroups the N terminal devices, the frequency hopping sequence of the first terminal device may be the same as a frequency hopping sequence of a second terminal device in a same group, but is different from a frequency hopping sequence of a third terminal device in the same group. In this way, some terminal devices in each group may perform uplink transmission on a same frequency band in any one of the L slots.

Optionally, frequency hopping sequences of any two of the N terminal devices are different. That is, a frequency hopping sequence of each terminal device is unique. For example, when the network device regroups the N terminal devices, frequency hopping sequences of all the terminal devices may be different.

In this case, any one of the N terminal devices, that is, the first terminal device may use the same pilot signal in any two of the L adjacent slots, or some or all of the pilot signals used by at least some of the N terminal devices in the L adjacent slots may be different.

Figure 9:
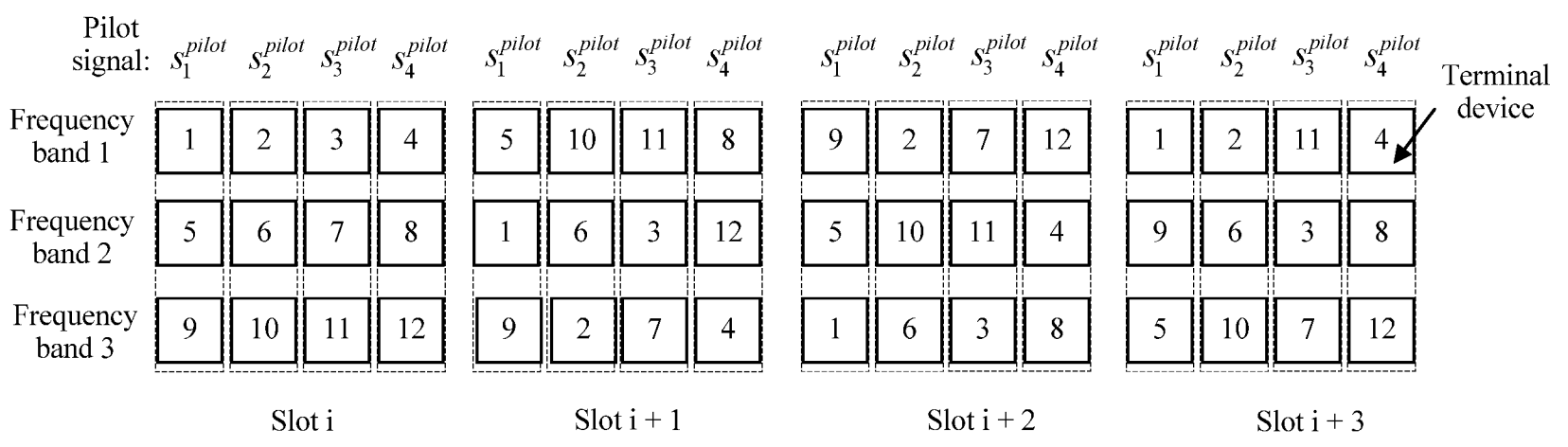

The following describes, with reference to FIG. 9, a case in which any one of the N terminal devices uses the same pilot signal in any two of the L adjacent slots.

As shown in FIG. 9, the terminal devices are not always grouped into one group. For example, in the slot i, a terminal device 1, a terminal device 2, a terminal device 3, and a terminal device 4 are grouped into one group, but in the slot i+1, the terminal device 1, a terminal device 6, the terminal device 3, and a terminal device 12 are grouped into one group. For another example, in the slot i, a terminal device 5, the terminal device 6, a terminal device 7, and a terminal device 8 are grouped into one group, but in the slot i+1, the terminal device 5, a terminal device 10, a terminal device 11, and a terminal device 18 are grouped into one group. By allocating the frequency hopping sequence in such a way, it may be ensured that the terminal device 1, the terminal device 5, and a terminal device 9 are not in one group.

In this way, by grouping two terminal devices into different groups in consecutive slots, a probability that the two terminal devices collide with each other during both initial transmission and retransmission can be reduced.

As shown in FIG. 9, terminal devices in a same group may use a same pilot signal, for example, the terminal device 1, the terminal device 5, and the terminal device 9 always use a same pilot signal $s_1^{pilot}$. For another example, the terminal device 2, the terminal device 6, and the terminal device 10 always use a same pilot signal $s_2^{pilot}$.

In such a manner, only one pilot signal needs to be allocated to each terminal device. In this way, the total quantity of pilot signals can be reduced; and in addition, complexity of configuring the pilot signal for the terminal device by a network may be reduced, and performance of detecting the terminal device by the network device can be improved.

Figure 10:
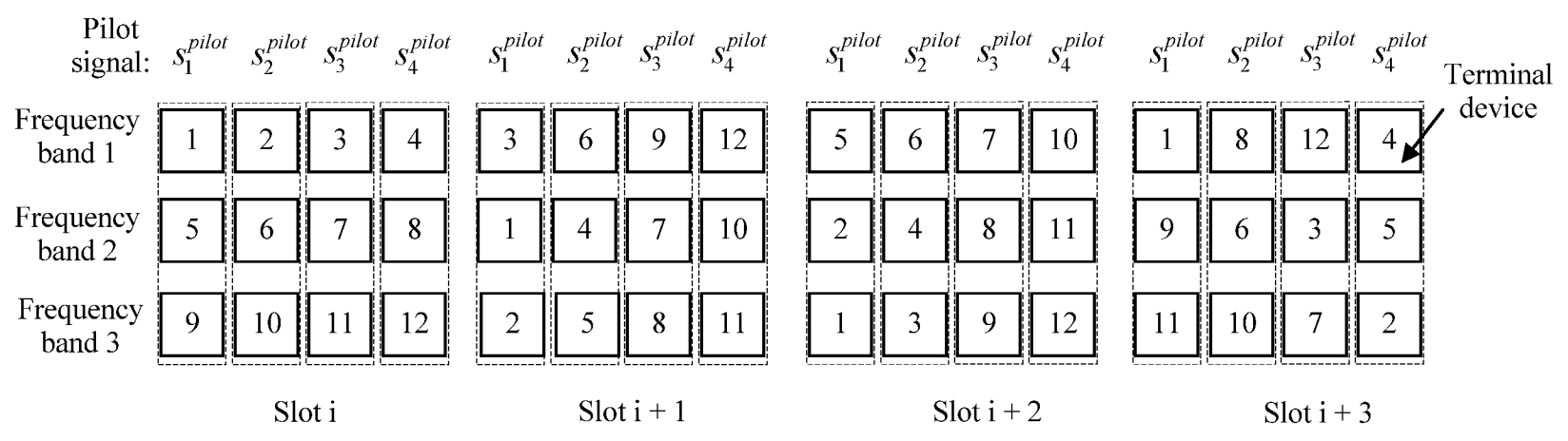

The following describes, with reference to FIG. 10, a case in which some or all of the pilot signals used by at least some of the N terminal devices in the L adjacent slots are different.

As shown in FIG. 10, the terminal devices are not always grouped into one group, and the pilot signal used by the terminal device also changes with time. For example, in the slot i, the terminal device 2 uses the pilot signal $s_2^{pilot}$ when performing uplink transmission on the frequency band 1, but in the slot i+1, the terminal device 2 uses the pilot signal $s_1^{pilot}$ when hopping to the frequency band 3 to perform uplink transmission. For another example, in the slot i, the terminal device 9 uses the pilot signal $s_1^{pilot}$ when performing uplink transmission on the frequency band 3, but in the slot i+1, the terminal device 9 uses a pilot signal $s_3^{pilot}$ when hopping to the frequency band 1 to perform uplink transmission. It can be learned that the terminal device may use different pilot signals in the L adjacent slots.

In this embodiment of this application, by grouping the terminal devices into different groups in the adjacent slots, and by enabling the terminal device to use different pilot signals in the adjacent slots, the terminal devices are regrouped and the pilot signals are re-allocated, so that a probability that the two terminal devices collide with each other during both initial transmission and retransmission can be further reduced.

S520. The network device sends first indication information to the first terminal device.

Specifically, the first indication information is used to determine the frequency hopping sequence of the first terminal device and a pilot signal used by the first terminal device in each slot. That is, the first terminal device may determine, based on the first indication information, the frequency hopping sequence of the first terminal device and the pilot signal used by the first terminal device in each slot.

Optionally, the first indication information may include available frequency band indication information. The available frequency band indication information is used to indicate frequency resources, in the L adjacent slots, that can be used by the N terminal devices. The first terminal device may determine, based on the first indication information, a frequency resource used by the first terminal device in each of the L adjacent slots.

In this embodiment of this application, the frequency resource may include a plurality of consecutive frequency bands, and the available frequency band indication information may include start locations of the plurality of frequency bands and bandwidth occupied by each of the plurality of consecutive frequency bands.

In this way, the terminal device can determine a frequency band indicated by the frequency hopping sequence, that is, can determine a frequency band used for uplink transmission.

Optionally, the first indication information may include frequency hopping sequence indication information. The frequency hopping sequence indication information is used to indicate the frequency hopping sequence of the first terminal device.

In an embodiment of the frequency hopping sequence indication information, the frequency hopping sequence indication information may include a frequency hopping sequence number of the first terminal device. The frequency hopping sequence number is used to indicate the frequency hopping sequence.

One frequency hopping sequence number may be corresponding to one frequency hopping sequence. For example, a frequency hopping sequence number 1 corresponds to a frequency hopping sequence 1234; or a frequency hopping sequence number 2 corresponds to a frequency hopping sequence 2341.

One frequency hopping sequence number may be corresponding to a plurality of frequency hopping sequences. Lengths of the plurality of frequency hopping sequences may be different. For example, a frequency hopping sequence number 1 corresponds to a frequency hopping sequence 2314 and a frequency hopping sequence 12435.

In another embodiment of the frequency hopping sequence indication information, the frequency hopping sequence indication information may include an ID of the first terminal device. The ID of the first terminal device corresponds to the frequency hopping sequence of the first terminal device.

The ID of the first terminal device may be corresponding to one frequency hopping sequence. For example, an ID 5 allocated by the network device to the first terminal device corresponds to the frequency hopping sequence 1234; or an ID 6 allocated by the network device to the first terminal device corresponds to the frequency hopping sequence 2341.

The ID of the first terminal device may be corresponding to a plurality of frequency hopping sequences. The lengths of the plurality of frequency hopping sequences may be different. For example, an ID 5 of the first terminal device corresponds to the frequency hopping sequence 2314 and the frequency hopping sequence 12435.

If one frequency hopping sequence number or one ID corresponds to the plurality of frequency hopping sequences, the first indication information may further include length indication information. The length indication information is used to indicate the length of the frequency hopping sequence of the first terminal device.

Optionally, the first indication information may include pilot signal indication information. The pilot signal indication information is used to indicate the pilot signal used by the first terminal device in each slot.

The pilot signal indication information may be a number that indicates the pilot signal used by the first terminal device. The pilot signal number is used to indicate indexes of the pilot signals used by the first terminal device in the L adjacent slots. The pilot signal index is used to indicate the pilot signal.

By way of example and not limitation, the network device may simultaneously send, in a multicast manner, the first indication information to a plurality of terminal devices that use a same frequency hopping sequence and that include the first terminal device.

By way of example and not limitation, the network device may simultaneously send, in the multicast manner, the first indication information to a plurality of terminal devices that use a same pilot signal and that include the first terminal device.

In addition, the network device may notify the N terminal devices one by one of first indication information corresponding to each of the N terminal devices. A specific manner in which the network device sends the first indication information is not limited in this embodiment of this application.

S530. The first terminal device determines, based on the first indication information, the frequency hopping sequence of the first terminal device and a pilot signal used by the first terminal device in each slot.

Optionally, the first terminal device may determine the frequency hopping sequence of the first terminal device based on the frequency hopping sequence indication information.

For example, the first terminal device may determine the frequency hopping sequence of the first terminal device based on the frequency hopping sequence number.

Specifically, in this embodiment of this application, the first terminal device and the network device use a same frequency hopping sequence set, and the set is stored by the first terminal device and the network device according to a standard specification, or is periodically notified by the network device to the first terminal device. After determining the frequency hopping sequence of the first terminal device, the network device may deliver a frequency hopping sequence number to the first terminal device, where the frequency hopping sequence number corresponds to one frequency hopping sequence in the frequency hopping sequence set, so that the terminal device may select, based on the frequency hopping sequence number, the frequency hopping sequence for transmission. Alternatively, the frequency hopping sequence number corresponds to a plurality of frequency hopping sequences in the frequency hopping sequence set, and the network device needs to deliver lengths of the frequency hopping sequences to the terminal device at the same time, so that the terminal device may determine, based on the frequency hopping sequence number and the lengths of the frequency hopping sequences, a frequency hopping sequence used for uplink transmission.

For example, the first terminal device may determine the frequency hopping sequence based on the ID of the first terminal device.

Specifically, the first terminal device and the network device use the same frequency hopping sequence set, and the set is stored by the first terminal device and the network device according to the standard specification, or is periodically notified by the network device to the first terminal device. After determining the frequency hopping sequence of the first terminal device, the network device may deliver an ID of the first terminal device, and the ID of the first terminal device corresponds to one frequency hopping sequence in the frequency hopping sequence set, so that the terminal device may select the frequency hopping sequence for transmission. Alternatively, the ID corresponds to a plurality of frequency hopping sequences in the frequency hopping sequence set, and the network device needs to deliver lengths of the frequency hopping sequences to the terminal device at the same time, so that the terminal device may determine, based on the ID of the first terminal device and the lengths of the frequency hopping sequences, the frequency hopping sequence used for uplink transmission.

Optionally, the first terminal device may determine, based on the pilot signal indication information, the pilot signal used by the first terminal device.

For example, the first terminal device may determine, based on the pilot signal number, the pilot signal used by the first terminal device.

For example, when the pilot signal number received by the first terminal device is 1, it indicates that indexes of the pilot signals used by the first terminal device in the L adjacent slots are 1111. A pilot signal whose index is 1 is the pilot signal $s_1^{pilot}$. Then, the first terminal device may use the pilot signal $s_1^{pilot}$ in each of the L adjacent slots.

For example, when the pilot signal number received by the first terminal device is 5, it indicates that indexes of the pilot signals used by the first terminal device in the L adjacent slots are 1234. The pilot signal whose index is 1 is the pilot signal $s_1^{pilot}$, a pilot signal whose index is 2 is the pilot signal $s_2^{pilot}$, a pilot signal whose index is 3 is the pilot signal $s_3^{pilot}$, a pilot signal whose index is 4 is the pilot signal $s_4^{pilot}$. Then, the first terminal device may use the pilot signals $s_1^{pilot}$, $s_2^{pilot}$, $s_3^{pilot}$, and $s_4^{pilot}$ respectively in the L adjacent slots.

Optionally, the terminal device may first determine the frequency hopping sequence of the first terminal device based on the frequency hopping sequence indication information, and then determine, based on a mapping relationship between the frequency hopping sequence and the pilot signal, the pilot signal used by the first terminal device in each slot.

Specifically, the first terminal device may store in advance mapping relationships between a plurality of frequency hopping sequences and a plurality of pilot signals. The mapping relationships between the plurality of frequency hopping sequences and the plurality of pilot signals may be mapping relationships between a plurality of frequency hopping sequence numbers and a plurality of pilot signal numbers. The terminal device may determine a pilot signal of the terminal device by searching for a pilot signal number corresponding to a frequency hopping sequence number of the terminal device. That the pilot signal whose index is 1 is the pilot signal $s_1^{pilot}$, the pilot signal whose index is 2 is the pilot signal $s_2^{pilot}$, the pilot signal whose index is 3 is the pilot signal $s_3^{pilot}$, the pilot signal whose index is 4 is the pilot signal $s_4^{pilot}$ is used as an example for description below.

In this embodiment of this application, the mapping relationships between the plurality of frequency hopping sequences and the plurality of pilot signals may be learned by the first terminal device in a manner of predefining, standard specification, signaling notification, factory setting, or the like. For the network device, the mapping relationships may also be learned by the network device in the manner of predefining, standard specification, signaling interaction, factory setting, or the like.

By the way, in this embodiment of this application, unless specially noted, content that needs to be learned by the network device or the first terminal device may be learned in the manner of predefining, standard specification, signaling interaction, factory setting, or the like; that is, a manner in which the network device or the first terminal device learns the content is not limited in this embodiment of this application.

For example, Table 1 shows a mapping relationship among a frequency hopping sequence number, a frequency hopping sequence, a pilot signal number, and a pilot signal index that are of each terminal device and that are shown in FIG. 9. As shown in Table 1, for example, a frequency hopping sequence number of the terminal device 1 is 2, a corresponding frequency hopping sequence is 1231, a pilot signal number is 1, and indexes of pilot signals are 1111; and a frequency hopping sequence number of the terminal device 2 is 1, a corresponding frequency hopping sequence is 1311, a pilot signal number is 2, and indexes of pilot signals are 2222.

TABLE 1

| Terminal device | Frequency hopping sequence number | Frequency hopping sequence | Pilot signal number | Pilot signal index |
|---|---|---|---|---|
| 1 | 2 | 1231 | 1 | 1111 |
| 2 | 1 | 1311 | 2 | 2222 |
| 3 | 3 | 1232 | 3 | 3333 |
| 4 | 6 | 1321 | 3 | 3333 |
| 5 | 5 | 2123 | 1 | 1111 |
| 6 | 8 | 2232 | 2 | 2222 |
| 7 | 10 | 2313 | 3 | 3333 |
| 8 | 11 | 2132 | 4 | 4444 |
| 9 | 12 | 3312 | 1 | 1111 |
| 10 | 9 | 3123 | 2 | 2222 |
| 11 | 7 | 3121 | 3 | 3333 |
| 12 | 4 | 3213 | 4 | 4444 |

Based on the mapping relationship shown in Table 1, each terminal device may determine, based on a frequency hopping sequence number of the terminal device or a frequency hopping sequence of the terminal device, a number of a pilot signal used in each slot, and then may determine the pilot signal used in each slot. For example, the terminal device 1 may determine, based on the frequency hopping sequence number 2 of the terminal device 1 or the frequency hopping sequence 1231 of the terminal device 1, that the number of the pilot signal used by the terminal device 1 is 1. Therefore, the terminal device 1 may determine that the pilot signal used in the slot i, the slot i+1, the slot i+2, and the slot i+3 is the pilot signal $s_1^{pilot}$ whose number is 1. For example, the terminal device 2 may determine, based on the frequency hopping sequence number 1 of the terminal device 2 or the frequency hopping sequence 1331 of the terminal device 2, that the number of the pilot signal used by the terminal device 1 is 2. Therefore, the terminal device 1 may determine that the pilot signal used in the slot i, the slot i+1, the slot i+2, and the slot i+3 is the pilot signal $s_2^{pilot}$ whose number is 2.

For example, Table 2 shows a mapping relationship among a frequency hopping sequence number, a frequency hopping sequence, a pilot signal number, and a pilot signal index that are of each terminal device and that are shown in FIG. 10. As shown in Table 2, for example, a frequency hopping sequence number of the terminal device 1 is 1, a corresponding frequency hopping sequence is 1231, a pilot signal number is 1, and indexes of pilot signals are 1111; and a frequency hopping sequence number of the terminal device 2 is 6, a corresponding frequency hopping sequence is 1323, a pilot signal number is 6, and indexes of pilot signals are 2114.

TABLE 2

| Terminal device | Frequency hopping sequence number | Frequency hopping sequence | Pilot signal number | Pilot signal index |
|---|---|---|---|---|
| 1 | 1 | 1231 | 1 | 1111 |
| 2 | 6 | 1323 | 6 | 2114 |
| 3 | 5 | 1132 | 2 | 3123 |
| 4 | 7 | 1221 | 8 | 4224 |
| 5 | 8 | 2312 | 10 | 1214 |
| 6 | 10 | 2112 | 11 | 2222 |
| 7 | 2 | 2213 | 9 | 3333 |
| 8 | 3 | 2321 | 12 | 4332 |
| 9 | 4 | 3132 | 3 | 1331 |
| 10 | 11 | 3213 | 4 | 2442 |
| 11 | 12 | 3323 | 5 | 3441 |
| 12 | 9 | 3131 | 7 | 4443 |

Based on the mapping relationship shown in Table 2, each terminal device may determine, based on the frequency hopping sequence number of each terminal device or the frequency hopping sequence of each terminal device, the number of the pilot signal used in each slot, and then may determine the pilot signal used in each slot. For example, the terminal device 1 may determine, based on the frequency hopping sequence number 1 of the terminal device 1 or the frequency hopping sequence 1231 of the terminal device 1, that the number of the pilot signal used by the terminal device 1 is 1. Therefore, the terminal device 1 may determine that the pilot signal used in the slot i, the slot i+1, the slot i+2, and the slot i+3 is the pilot signal $s_1^{pilot}$ whose number is 1. For example, the terminal device 2 may determine, based on the frequency hopping sequence number 6 of the terminal device 2 or the frequency hopping sequence 1323 of the terminal device 2, that the number of the pilot signal used by the terminal device 1 is 6. Therefore, the terminal device 1 may determine that the pilot signal used in the slot i is the pilot signal $s_2^{pilot}$ whose index is 2, the pilot signal used in the slot i+1 is the pilot signal $s_1^{pilot}$ whose index is 1, the pilot signal used in the slot i+2 is the pilot signal $s_1^{pilot}$ whose index is 1, and the pilot signal used in the slot i+3 is the pilot signal $s_4^{pilot}$ whose index is 4.

After the first terminal device determines the used pilot signal, when uplink transmission needs to be performed, the first terminal device may send a pilot signal corresponding to the first terminal device to the network device on a frequency resource corresponding to a frequency hopping sequence.

Therefore, in the transmission method according to this embodiment of this application, the terminal device uses the grouping frequency hopping scheme, each terminal device in the group is configured with the different pilot signal, and all groups share a pilot pool including K (each group includes a maximum of K terminal devices) pilot signals. Therefore, the transmission method according to this embodiment of this application can reduce the total quantity of pilot signals, and can improve performance of detecting the terminal device by the network device.

The foregoing has described the transmission method according to the embodiments of this application in detail with reference to FIG. 2 and FIG. 10. The following describes in detail transmission devices according to the embodiments of this application with reference to FIG. 11 and FIG. 12, where the transmission devices include a network device and a terminal device.

Figure 11:
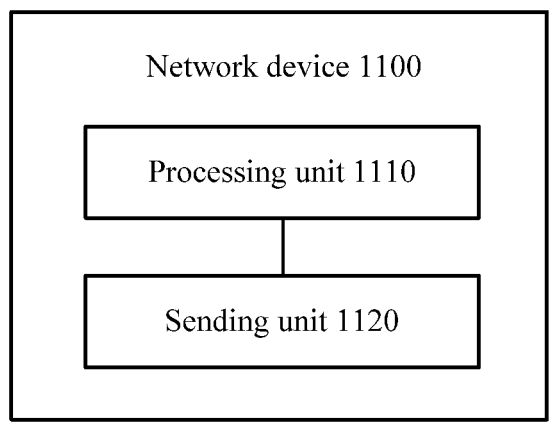
FIG. 11 is a schematic block diagram of a network device according to an embodiment of this application.

FIG. 11 is a schematic block diagram of a network device 1100 according to an embodiment of this application. As shown in FIG. 10, the network device 1100 includes: a processing unit 1110 and a sending unit 1120.

The processing unit 1110 is configured to determine a frequency hopping sequence of each of N terminal devices grouped into a plurality of groups in each of L adjacent slots, where a length of the frequency hopping sequence is L, any two terminal devices in each group of terminal devices in each slot use a same frequency resource, any two groups of terminal devices in each slot use different frequency resources, and each group of terminal devices in each slot includes a maximum of K terminal devices, where N>2, L≥2, 2≤K<N, pilot signals used by each group of terminal devices in each slot are elements in a set that includes K different pilot signals, and pilot signals used by the any two terminal devices in each group in each slot are different.

The sending unit 1120 is configured to send first indication information to a first terminal device in the N terminal devices, where the first indication information is used to determine a frequency hopping sequence of the first terminal device and a pilot signal used by the first terminal device in each slot.

Optionally, the first indication information includes frequency hopping sequence indication information, and the frequency hopping sequence indication information is used to indicate the frequency hopping sequence used by the first terminal device.

Optionally, the frequency hopping sequence indication information includes a frequency hopping sequence number of the first terminal device or an identifier of the first terminal device, and the identifier of the first terminal device corresponds to the frequency hopping sequence of the first terminal device.

Optionally, the first indication information further includes available frequency band indication information and/or length indication information, the available frequency band indication information is used to indicate a frequency resource that can be used in the L adjacent slots, and the length indication information is used to indicate a length of the frequency hopping sequence of the first terminal device.

Optionally, the sending unit 1120 is specifically configured to simultaneously send, in a multicast manner, the first indication information to a plurality of terminal devices that use a same frequency hopping sequence, where the plurality of terminal devices includes the first terminal device.

Optionally, terminal devices grouped into a same group in a first slot in the L slots are grouped into a same group in any other slot.

Optionally, at least some of terminal devices grouped into a same group in a first slot in the L slots are not in a same group in another slot.

Optionally, the first indication information further includes pilot signal indication information, and the pilot signal indication information is used to indicate the pilot signal used by the first terminal device in each slot.

Optionally, the sending unit 1120 is specifically configured to simultaneously send, in the multicast manner, the first indication information to a plurality of terminal devices that use a same pilot signal in the L adjacent slots, where the plurality of terminal devices includes the first terminal device.

Optionally, the first terminal device uses a same pilot signal in the L adjacent slots.

Optionally, pilot signals used by at least some of the N terminal devices in at least two of the L adjacent slots are different.

Optionally, the processing unit 1110 is further configured to group the N terminal devices into the plurality of groups in each of the L adjacent slots.

Optionally, the processing unit 1110 is specifically configured to group the N terminal devices into the plurality of groups in each of the L adjacent slots based on at least one of the following conditions: a channel condition, a distance between the network device and each of the N terminal devices, or a packet arrival rate of each of the N terminal devices.

It should be noted that the processing unit 1110 may be implemented by using a processor, and the sending unit 1120 may be implemented by using a transmitter.

It should be further understood that the network device 1100 may be corresponding to the network device described in the foregoing method, and modules or units in the network device 1100 are separately configured to perform each action or processing process performed by the network device in the method embodiment shown in FIG. 5. To avoid repetition, detailed descriptions thereof are omitted herein.

Figure 12:
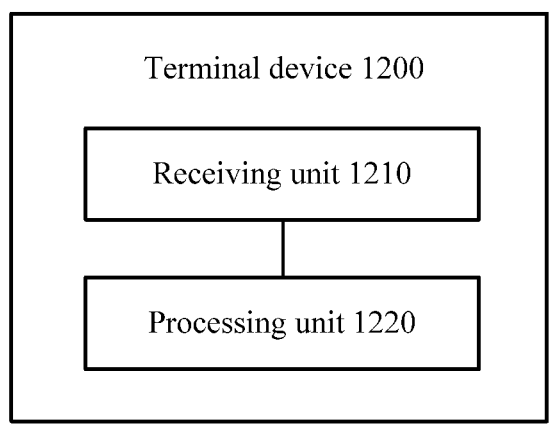
FIG. 12 is a schematic block diagram of a terminal device according to an embodiment of this application.

FIG. 12 is a schematic block diagram of a terminal device 1200 according to an embodiment of this application. As shown in FIG. 12, the terminal device 1200 includes a receiving unit 1210 and a processing unit 1220.

The receiving unit 1210 is configured to receive first indication information sent by a network device, where the terminal device is one of N terminal devices grouped by the network device into a plurality of groups in each of L adjacent slots, where N>2, and L≥2.

The processing unit 1220 is configured to determine, based on the first indication information, a frequency hopping sequence of the terminal device and a pilot signal used by the terminal device in each slot.

Optionally, the first indication information includes frequency hopping sequence indication information, and the frequency hopping sequence indication information is used to indicate the frequency hopping sequence used by the terminal device.

Optionally, the frequency hopping sequence indication information includes a frequency hopping sequence number of the terminal device or an identifier of the terminal device, and the identifier of the terminal device corresponds to the frequency hopping sequence of the terminal device.

Optionally, the processing unit 1220 is specifically configured to:
determine the frequency hopping sequence of the terminal device based on the frequency hopping sequence indication information; and
determine, based on a mapping relationship between the frequency hopping sequence and the pilot signal, the pilot signal used by the terminal device in each slot.

Optionally, the first indication information includes pilot signal indication information, and the pilot signal indication information is used to indicate the pilot signal used by the terminal device in each slot.

Optionally, the first indication information further includes available frequency band indication information and/or length indication information, the available frequency band indication information is used to indicate a frequency resource that can be used in the L adjacent slots, and the length indication information is used to indicate a length of the frequency hopping sequence of the terminal device.

It should be understood that the receiving unit 1210 may be implemented by a receiver, and the processing unit 1220 may be implemented by a processor.

It should be further understood that the terminal device 1200 may be corresponding to the first terminal device described in the foregoing method, and modules or units in the terminal device 1200 are separately configured to perform each action or processing process performed by the first terminal device in the method embodiment shown in FIG. 5. To avoid repetition, detailed descriptions thereof are omitted herein.

This embodiment of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using an instruction in a form of software. The foregoing processor may be a central processing unit (CPU), the processor may further be another general purpose processor, a digital signal processor (DSP), an application-specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software in the decoding processor. A software unit may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory of the systems and methods described in this specification includes but is not limited to these and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In an implementation process, steps in the foregoing methods can be implemented by using a hardware integrated logical circuit in the processor, or by using an instruction in a form of software. The steps of the processing method for communications interface fault disclosed with reference to the embodiments of this application may be directly performed by a hardware processor, or may be performed by using a combination of hardware in the processor and software. A software unit may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a Solid State Disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission method, comprising:
determining, by a network device, a frequency hopping sequence of each of N terminal devices grouped by the network device into G groups in each of L adjacent slots, wherein a length of the frequency hopping sequence is L, any two terminal devices in each group of terminal devices in each slot use a same frequency resource, any two groups of terminal devices in each slot use different frequency resources, and each group of terminal devices in each slot comprises a maximum of K terminal devices, wherein N>2, G≥2, L≥2, 2≤K<N, pilot signals used by each group of terminal devices in each slot are elements in a set that comprises K different pilot signals, and each terminal device in each group in each slot uses a different pilot signal from the set of K different pilot signals in the frequency hopping sequence; and
sending, by the network device, first indication information to a first terminal device in the N terminal devices, wherein the first indication information determines a frequency hopping sequence of the first terminal device and a pilot signal used by the first terminal device in each slot.

2. The method according to claim 1, wherein the first indication information comprises frequency hopping sequence indication information, and the frequency hopping sequence indication information indicates the frequency hopping sequence used by the first terminal device.

3. The method according to claim 2, wherein the frequency hopping sequence indication information comprises a frequency hopping sequence number of the first terminal device or an identifier of the first terminal device, and the identifier of the first terminal device corresponds to the frequency hopping sequence of the first terminal device.

4. The method according to any one of claim 1 wherein the first indication information further comprises available frequency band indication information and/or length indication information, the available frequency band indication information indicates a frequency resource that can be used in the L adjacent slots, and the length indication information indicates a length of the frequency hopping sequence of the first terminal device.

5. The method according to any one of claim 1, wherein the sending, by the network device, first indication information to the first terminal device in the N terminal devices comprises:
simultaneously sending, by the network device in a multicast manner, the first indication information to a plurality of terminal devices that use a same frequency hopping sequence, wherein the plurality of terminal devices comprise the first terminal device.

6. The method according to any one of claim 1, wherein terminal devices grouped into a same group in a first slot in the L slots are grouped into a same group in any other slot.

7. The method according to any one of claim 1, wherein at least some of the terminal devices grouped into a same group in a first slot in the L slots are not in a same group in another slot.

8. The method according to claim 1, wherein the first indication information further comprises pilot signal indication information, and the pilot signal indication information indicates the pilot signal used by the first terminal device in each slot.

9. A transmission method, comprising:
receiving, by a first terminal device, first indication information sent by a network device, wherein the first terminal device is one of N terminal devices grouped by the network device into G groups in each of L adjacent slots, wherein N>2, L≥2, and G≥2, and wherein the first indication information comprises pilot signal indication information, and the pilot signal indication information indicates a pilot signal from a set of K different pilot to be used by the first terminal device in each slot during frequency hopping; and
determining, by the first terminal device based on the first indication information, a frequency hopping sequence of the first terminal device and the pilot signal used by the first terminal device in each slot in the frequency hopping sequence, wherein the pilot signal used by the first terminal in each of the L adjacent slots in the frequency hopping sequence is different from each pilot signal used by each other terminal in the group to which the first terminal belongs in each of the L adjacent slots.

10. The method according to claim 9, wherein the first indication information comprises frequency hopping sequence indication information, and the frequency hopping sequence indication information indicates the frequency hopping sequence used by the first terminal device.

11. The method according to claim 10, wherein the frequency hopping sequence indication information comprises a frequency hopping sequence number of the first terminal device or an identifier of the first terminal device, and the identifier of the first terminal device corresponds to the frequency hopping sequence of the first terminal device.

12. The method according to claim 9, wherein the determining, by the first terminal device based on the first indication information, the frequency hopping sequence of the first terminal device and the pilot signal used by the first terminal device in each slot comprises:

determining, by the first terminal device, the frequency hopping sequence of the first terminal device based on the frequency hopping sequence indication information; and determining, by the first terminal device based on a mapping relationship between the frequency hopping sequence and the pilot signal, the pilot signal used by the first terminal device in each slot.

13. The method according to claim 9, wherein the first indication information further comprises available frequency band indication information and/or length indication information, the available frequency band indication information indicates a frequency resource that can be used in the L adjacent slots, and the length indication information indicates a length of the frequency hopping sequence of the first terminal device.

14. A terminal device, comprising:
a receiver configured to receive first indication information sent by a network device, wherein the terminal device is one of N terminal devices grouped by the network device into G groups in each of L adjacent slots, wherein N>2, L≥2, and G≥2, and wherein the first indication information comprises pilot signal indication information, and the pilot signal indication information indicates a pilot signal from a set of K different pilot to be used by the first terminal device in each slot during frequency hopping; and
a processor coupled with the receiver configured to determine, based on the first indication information, a frequency hopping sequence of the terminal device and a pilot signal used by the terminal device in each slot in the frequency hopping sequence, wherein the pilot signal used by the first terminal in each of the L adjacent slots in the frequency hopping sequence is different from each pilot signal used by each other terminal in the group to which the first terminal belongs in each of the L adjacent slots.

15. The terminal device according to claim 14, wherein the first indication information comprises frequency hopping sequence indication information, and the frequency hopping sequence indication information indicates the frequency hopping sequence used by the terminal device.

16. The terminal device according to claim 15, wherein the frequency hopping sequence indication information comprises a frequency hopping sequence number of the terminal device or an identifier of the terminal device, and the identifier of the terminal device corresponds to the frequency hopping sequence of the terminal device.

17. The terminal device according to claim 15, wherein the processor is configured to:
determine the frequency hopping sequence of the terminal device based on the frequency hopping sequence indication information; and
determine, based on a mapping relationship between the frequency hopping sequence and the pilot signal, the pilot signal used by the terminal device in each slot.

18. The terminal device according to claim 14, wherein the first indication information further comprises available frequency band indication information and/or length indication information, the available frequency band indication information indicates a frequency resource that can be used in the L adjacent slots, and the length indication information indicates a length of the frequency hopping sequence of the terminal device.

* * * * *